United States Patent [19]

Kyogoku et al.

[11] 4,292,943
[45] Oct. 6, 1981

[54] CONTACTLESS IGNITION SYSTEM FOR USE WITH INTERNAL COMBUSTION ENGINES

[75] Inventors: Yoshito Kyogoku, Mito; Hiroshi Katada, Katsuta, both of Japan

[73] Assignee: Hitachi, Ltd., Tokyo, Japan

[21] Appl. No.: 15,132

[22] Filed: Feb. 26, 1979

[30] Foreign Application Priority Data

Feb. 24, 1978 [JP] Japan .................. 53/19632
Jul. 10, 1978 [JP] Japan .................. 53/83026

[51] Int. Cl.³ .............................................. F02P 5/08
[52] U.S. Cl. ......................................... 123/427; 123/418; 123/643
[58] Field of Search ....... 123/117 R, 117 D, 146.5 A, 123/148 ND, 148E

[56] References Cited

U.S. PATENT DOCUMENTS

| | | | |
|---|---|---|---|
| 3,418,989 | 12/1968 | Silverman | 123/148 E |
| 4,066,968 | 1/1978 | Guipaud | 123/148 E |
| 4,086,894 | 5/1978 | Capurka et al. | 123/148 E |
| 4,100,895 | 7/1978 | Hattori et al. | 123/117 R |
| 4,106,440 | 8/1978 | Lai et al. | 123/117 R |
| 4,164,204 | 8/1979 | Guipaud | 123/117 R |

FOREIGN PATENT DOCUMENTS 2252026 6/1975 France ................... 123/117 D

Primary Examiner—Charles J. Myhre
Assistant Examiner—Andrew M. Dolinar
Attorney, Agent, or Firm—Craig and Antonelli

[57] ABSTRACT

A contactless ignition system for use with an internal combustion engine has at least one pulser adapted to detect predetermined maximum and minimum advance angular positions of ignition timing. A first triangular wave form having a first rising gradient and a second triangular wave form having a second rising gradient are formed based on the output of the pulser. When a voltage representative of sum of the first triangular wave form and a reference voltage of a fixed level and the second triangular wave form coincide with each other, an advanced ignition signal of ignition timing is produced, whereby substantially constant advance angles are maintained within low speed range and high speed range of the engine and an advance angle at intermediate speeds of the engine is so controlled as to be proportional to the number of rotations of the engine.

10 Claims, 14 Drawing Figures

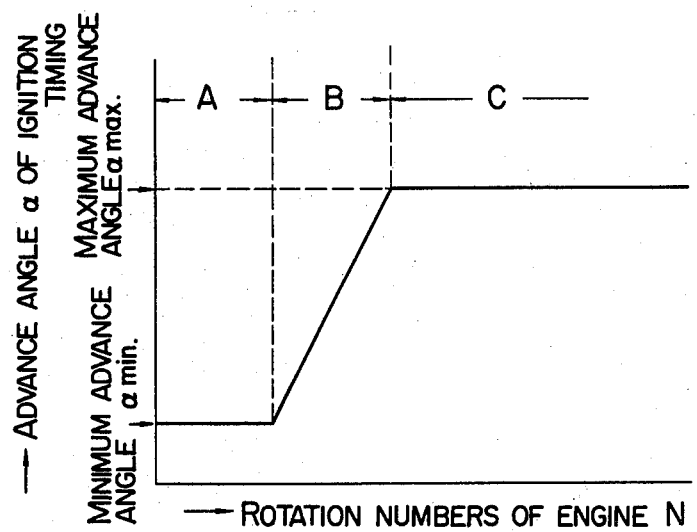
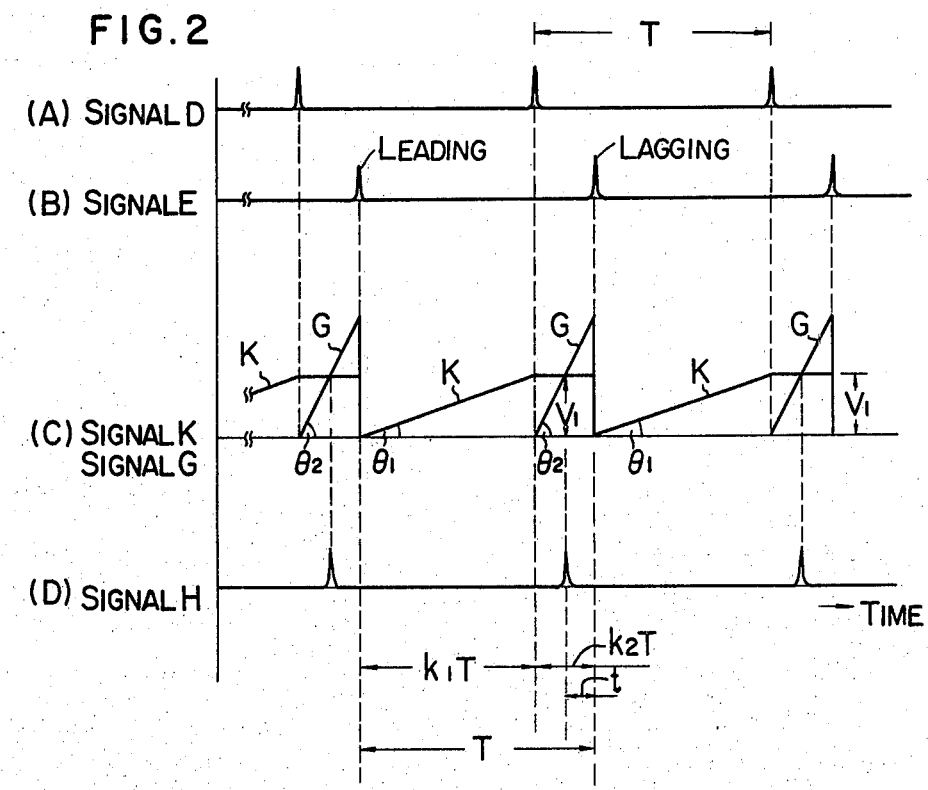

CONTACTLESS IGNITION SYSTEM FOR USE WITH INTERNAL COMBUSTION ENGINES

The present invention relates to a contactless ignition system used for internal combustion engines and more particularly to a contactless ignition system for electronically controlling advance angles of ignition timing.

It has hitherto been the practice to control advance angles of ignition timing by means of mechanical governors and/or negative pressure means. However, current regulations concerning exhaust gas and the like regulations pose severe accuracy requirements in controlling advance angles of ignition timing and durability of advance angle controlling systems, and the existent mechanical governors pose difficulty in meeting the requirements.

Systems for electronically controlling advance angles of ignition timing have been known, as disclosed in Japanese Laid-Open specification laid open Nos. 120334/1976 and 43036/1977. These systems, however, employ a so-called dual slope type control method using a single integrating circuit and for this reason, suffer from poor accuracies in controlling advance angles during high speed rotation of internal combustion engines.

An object of the present invention is therefore to provide a contactless ignition system for use with internal combustion engines which is capable of controlling advance angles of ignition timing with high accuracies such that substantially constant advance angles are maintained within low speed range and high speed range of the engine and an advance angle at intermediate speeds of the engine is so controlled as to be proportional to the number of rotations of the engine.

According to one aspect of the present invention, there is provided to contactless ignition system for use with an internal combustion engine comprising a magnetic rotor with means rotatable in synchronism with the engine, for detecting an ignition angle, means for controlling the advance angle of ignition timing, a semiconductor switching circuit actuatable with an ignition signal delivered from the advance angle controlling means, and an ignition coil connected to the semiconductor switching circuit, the advance angle controlling means comprising means for detecting a predetermined maximum advance angular position of ignition timing, means for detecting a predetermined minimum advance angular position of ignition timing, a first integrating circuit which starts an integration in response to the detection of the maximum advance angular position and terminates the integration in response to the detection of the minimum advance angular position to generate an output of a first triangular wave form, adder means for adding a signal of a predetermined, fixed level to the output of the first integrating circuit, a second integrating circuit which starts an integration in response to the detection of the minimum advance angular position and terminates the integration in response to the detection of the maximum advance angular position to generate an output of a second triangular wave form, and a comparator circuit which produces the ignition signal when the output level of the adder means coincides with the output level of the second integrating circuit.

According to another aspect of the present invention, there is provided a contactless ignition system for use with an internal combustion engine comprising a magnetic rotor with means rotatable in synchronism with the engine for detecting an ignition angle, the projection means having a peripheral width corresponding to a predetermined maximum advance angle, means for controlling the advance angle of ignition timing, a semiconductor switching circuit actuatable with an ignition signal delivered from the advance angle controlling means, and an ignition coil connected to the semiconductor switching circuit, the advance angle controlling means comprising a plurality of pulsers for detecting maximum and minimum advance angular positions of ignition timing, a first integrating circuit which starts an integration in response to the detection of the maximum advance angular position derived from the respective pulsers and terminates the integration in response to the detection of the minimum advance angular position derived from the respective pulsers to generate an output of a first triangular wave form, adder means for adding a signal of a fixed level to the output of the first integrating circuit, a second integrating circuit which starts an integration in response to the detection of the minimum advance angular position derived from the respective pulsers and terminates the integration in response to the detection of the maximum advance angular position to generate an output of a second triangular wave form, a comparator circuit which produces an output signal when the output level of the adder means coincides with the output level of the second integrating circuit, and a plurality of AND-gates being of the same number as the pulsers, respective AND-gates having one input terminal connected to the output of the respective pulsers and the other input terminal connected to the output of the comparator circuit to produce the ignition signal associated with the respective pulsers.

According to still another aspect of the present invention, there is provided a contactless ignition system for use with an internal combustion engine comprising a magnetic rotor with projection means rotatable in synchronism with the engine, means for controlling the advance angle of ignition timing, a semiconductor switching circuit actuatable with an ignition signal delivered from the advance angle controlling means, and an ignition coil connected to the semiconductor switching circuit, the advance angle controlling means comprising a first pulser for detecting a predetermined maximum advance angular position of ignition timing, a second pulser for detecting a predetermined minimum advance angular position of ignition timing, a bistable multivibrator having its set terminal connected to the output of the first pulser and its reset terminal connected to the output of the second pulser to produce a first output signal and a second output signal which is the inversion of the first output signal, a first integrating circuit which starts an integration in response to rising of the first output of the multivibrator and terminates the integration in response to falling of the first output to generate an output of a first triangular wave form having a first predetermined gradient, adder means for adding the first output of the multivibrator to the output of the first integrating circuit, a second integrating circuit including a capacitor which starts being charged with a constant current in response to falling of the first output of the multivibrator and which is discharged by a differentiation signal derived from the second output of the multivibrator, thereby generating an output of a second triangular wave form having a second predetermined gradient, a comparator circuit which produces the ignition signal when the output level of the adder means coincides with the output level of the second integrating circuit, and means for connecting the output signal of the second pulser to an output terminal of the advance angle controlling means.

According to still another aspect of the present invention, there is provided a contactless ignition system for use with an internal combustion engine comprising a magnetic rotor with projection means rotatable in synchronism with the engine, means for controlling the advance angle of ignition timing, a semiconductor switching circuit actuatable with an ignition signal delivered from the advance angle controlling means, and an ignition coil connected to the semiconductor switching circuit, the projection means of the magnetic rotor having a peripheral width substantially corresponding to a predetermined maximum advance angle, the advance angle controlling means comprising a first pulser for detecting predetermined maximum and minimum advance angular positions of ignition timing, a second pulser for detecting the predetermined maximum and minimum advance angular positions of ignition timing, a first bistable multivibrator having its set and reset terminal connected to the output of the first pulser, a second bistable multivibrator having its set and reset terminal connected to the output of the second pulser, a first integrating circuit which starts an integration in response to rising of the ORed signal obtained from the first and second multivibrators and terminates the integration in response to falling of the ANDed signal to generate an output of a first triangular wave form having a first predetermined gradient, adder means for adding the ANDed signal to the output of the first integrating circuit, a second integrating circuit including a capacitor which starts being charged with a constant current in response to falling of the ANDed signal and which is discharged by a differentiation signal derived from the ORed signal, thereby generating an output of a second triangular wave form having a second predetermined gradient, a comparator circuit which produces an output signal when the output level of the adder means coincides with the output level of the second integrating circuit, and first and second AND-gates respectively having one input terminal connected to each of the first and second bistable multivibrators and the other input terminal connected to the output of the comparator circuit to produce the ignition signal associated with the respective first and second pulsers.

The above and other objects, features and advantages of the present invention will be more clear from the following description with reference to the accompanying drawings, in which:

FIG. 1 is a graph showing, in relation to the number of rotations of an engine, a controlling pattern of ignition timing advance angles;

FIGS. 2 and 3 are diagrams of wave forms illustrated at A, B, C and D and at A and B, respectively, to explain a principle of advance angle controlling operation of a system according to the invention;

Figure 3:
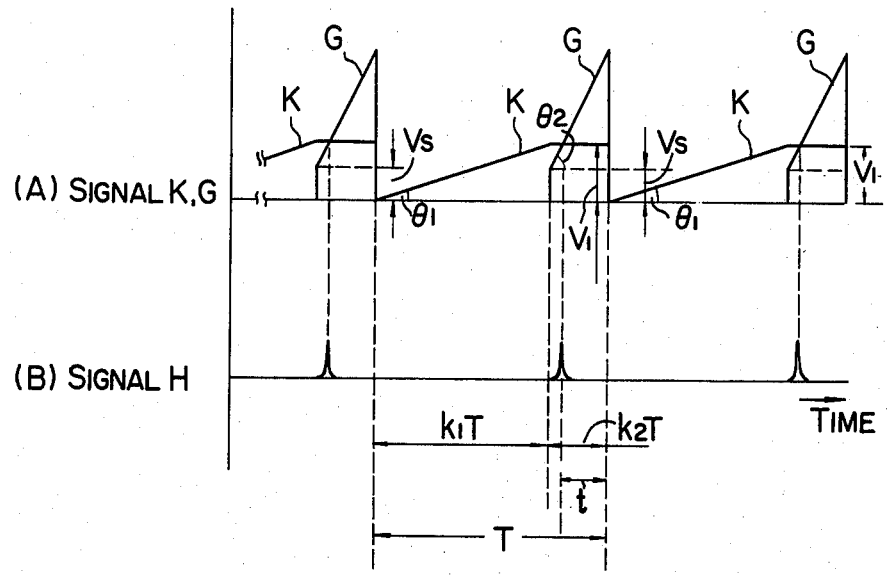

Referring now to FIGS. 1 to 3, a principle on which an electronic advance angle controlling system according to the invention is based will first be described.

As graphically shown in FIG. 1, a characteristic curve of an advance angle $\alpha$ of ignition timing in relation to a number N of rotations of the engine consists of a range A wherein the ignition timing corresponds to a minimum advance angle $\alpha_{min}$, a range B wherein the ignition timing varies in proportion to the number of rotations of the engine, and a range C wherein the ignition timing corresponds to a maximum advance angle $\alpha_{max}$.

In order to obtain this characteristic curve electrically, the maximum advance angle $\alpha_{max}$ and the minimum advance angle $\alpha_{min}$ are first detected and then advance angles between $\alpha_{max}$ and $\alpha_{min}$ are so determined as to be proportional to a number N of rotations of the internal combustion engine.

A principle of the electronic advance angle, which is controlling within the range B, will best be explained by referring to FIGS. 2 and 3. Pulse signals D and E, each representative of a maximum advance angle and a minimum advance angle, are generated by first and second pulsers, respectively. Concurrently with the generation of the pulse signal E, a capacitor, for example, begins to be charged with a constant current so that a triangular voltage wave form K having a constant rising angle or constant gradient $\theta_1$ is produced. The integrating operation due to the capacitor is terminated when the pulse signal D is detected. At this time, the triangular voltage wave form K has reached a voltage $V_1$ which is in inverse proportion to the number N of rotations of the engine. At this point in time, a second triangular wave form generating circuit produces a triangular wave form G which rises in response to the generation of the pulse signal D representative of the maximum advance angle and terminates in response to the pulse signal E representative of the minimum advance angle, wherein voltage of the triangular wave form G is compared with the voltage $V_1$ to thereby produce an advance angle pulse H. With this expedient, however, it is impossible to advance the advance angle pulse H. Because, in accordance with change in the number N of rotations of the engine, periods T of the pulse signals D and E and the bases of the triangular wave forms K and G change at a proportional changing rate, whereas the wave forms illustrated at C of FIG. 2 are merely changed with analogous reduction or enlargement. Accordingly, angular positions at which the advance angle pulse signal H is generated which are measured relative to the minimum advance angular position will not change with the number N of rotations. In other words, the rotation angle corresponding to the value of time t remains unchanged. This will be explained by using mathematical formulae. Where the number of rotations of the engine is N r.p.m.; the period is T seconds; spacings of a leading minimum advance angular position and a lagging minimum advance angular position with respect to a maximum advance angular position are in the ratio $k_1:k_2$; the $k_1$ and $k_2$ are independent of the number N of rotations of the engine and when the maximum advance angular position leads with respect to the minimum advance angular position by, for example, 30 degrees, it follows that $$k_1 = \frac{360 \text{ degrees} - 30 \text{ degrees}}{360 \text{ degrees}}$$

and $$k_2 = \frac{30 \text{ degrees}}{360 \text{ degrees}};$$

time lapse between an angular position at which an advance angle pulse is generated and the lagging minimum advance angular position is t seconds (which corresponds to an advance angle $\alpha$), and rising angles of the triangular wave forms K and G are $\theta_1$ and $\theta_2$, respectively ($\theta_1$ and $\theta_2$ being independent of the number N of rotations and $\theta_1 < \theta_2$), stand.

$$T = \frac{60}{N} \quad (1)$$

$$t = k_2 T - \frac{\tan \theta_1}{\tan \theta_2} k_1 T \quad (2)$$

Therefore, the advance angle $\alpha$ of the advance angle pulse H is, $$\alpha = 360 \text{ degrees} \times \frac{t}{T}$$

$$= 360 \text{ degrees} \times \left( \frac{k_2 T - \frac{\tan \theta_1}{\tan \theta_2} k_1 T}{T} \right) \quad (3)$$

$$= 360 \text{ degrees} \times \left( k_2 - \frac{\tan \theta_1}{\tan \theta_2} k_1 \right). \quad (4)$$

As will be seen from equation (4), the value of the advance angle is independent of the number N of rotations.

To solve this problem, according to the present invention, a fixed voltage $V_s$ is added to the triangular wave form G as shown in FIG. 3 and the sum is compared with the voltage $V_1$. By introducing the fixed voltage $V_s$ independent of the number N of rotations, the advance angle controlling of FIG. 3 offers a controllable advance angle $\alpha$. This will be explained by using mathematical formulae. When the triangular wave form G is added with the fixed voltage $V_s$, stand.

$$t = k_2 T - \frac{k_1 T \tan \theta_1 - V_s}{\tan \theta_2} \quad (5)$$

$$\alpha = 360 \text{ degrees} \times \frac{t}{T}$$

$$= 360 \text{ degrees} \left\{ \left( k_2 - \frac{\tan \theta_1}{\tan \theta_2} K_1 \right) + \frac{V_s}{\tan \theta_2} \times \frac{1}{T} \right\} \quad (6)$$

$$= 360 \text{ degrees} \left\{ \left( k_2 - \frac{\tan \theta_1}{\tan \theta_2} k_1 \right) + \frac{V_s}{\tan \theta_2} \times \frac{N}{60} \right\} \quad (7)$$

As will be seen from equation (7), the advance angle pulse H is advanced in proportion to the number N of rotations of the engine.

Figure 4:
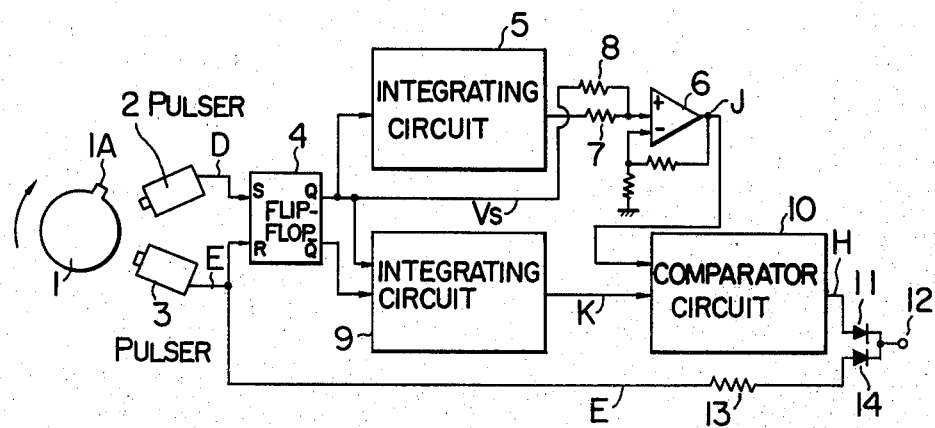
FIG. 4 is a block diagram of one embodiment of an advance angle controlling unit in the system according to the invention.
Figure 5:
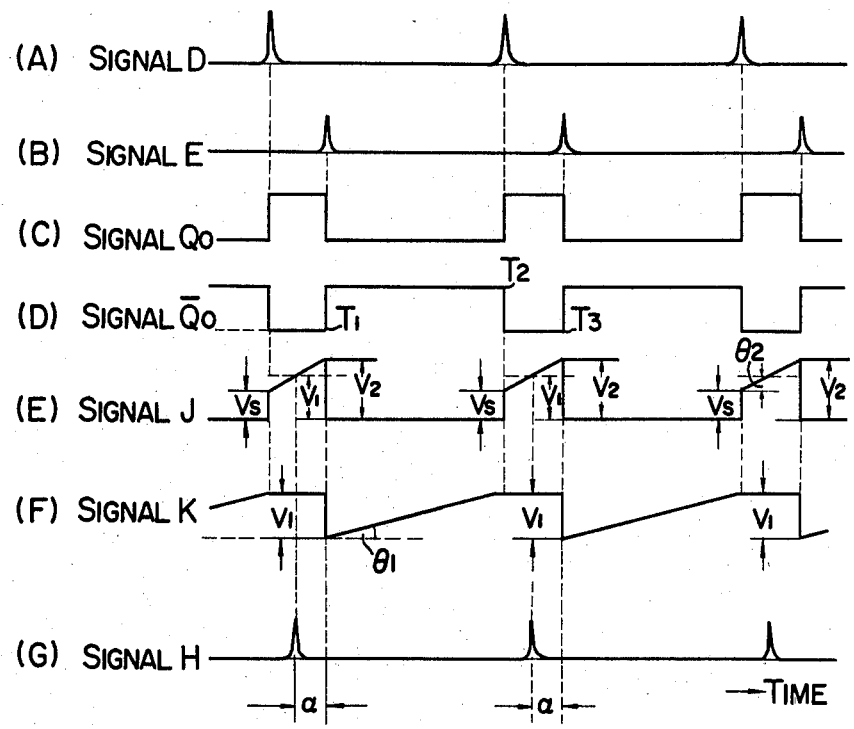
FIG. 5 is a diagram of wave forms illustrated at A, B, C, D, E, F and G to show output signals from component circuits in FIG. 4 for the sake of explaining operation of the FIG. 4 circuit.

The invention incorporates a preferred embodiment of an advance angle controlling unit as shown in a block diagram of FIG. 4 which comprises a magnetic rotor 1 rotatable in synchronism with an internal combustion engine and having a local projection 1A, a first pulser 2 comprised of a dynamo which is located in alignment with the maximum advance angular position to produce the first pulse signal D representative of the maximum advance angle as shown at A of FIG. 5, and a second pulser 3 which is located in alignment with the minimum advance angular position to produce the second pulse signal E representative of the minimum advance angle as shown at B of FIG. 5. An RS type flip-flop 4 receives at its set input S the pulse signal D from the pulser 2 and at its reset input R the pulse signal E from the pulser 3. Accordingly, the RS type flip-flop 4 delivers a Q output $Q_o$ and a $\overline{Q}$ output $\overline{Q}_o$ as shown at C and D of FIG. 5, respectively. An integrating circuit 5 begins to integrate the output $Q_o$ at its rising and resets it at its falling. An adder circuit 6 comprised of an operational amplifier, for example, adds the output of integrating circuit 5 received via a resistor 7 to the fixed voltage $V_s$ originating from the Q output of RS type flip-flop 4 which is received via a resistor 8. The adder circuit 6 produces an output signal J as shown at E of FIG. 5. A second integrating circuit 9 receives the Q and $\overline{Q}$ outputs of the RS type flip-flop 4 and begins to integrate the $\overline{Q}$ output at its rising at $T_1$ and stops integrating the $\overline{Q}$ output at its falling at $T_2$. The ultimate integration voltage $V_1$ is held until the $\overline{Q}$ output undergoes a subsequent rising at $T_3$. Thus, the second integrating circuit 9 produces an output signal K as shown at F of FIG. 5. A comparator circuit 10 compares the output J of the adder circuit 6 with the output K of the second integrating circuit 9 to produce the advance angle pulse signal H when the outputs J and K coincide with each other. This signal H advances the ignition timing by $\alpha$. An output of the comparator circuit 10 representative of the advance angle pulse signal H is delivered to an output terminal 12 of the advance angle controlling unit via a diode 11. The output signal E of the pulser 3, on the other hand, is delivered to the output terminal 12 via a resistor 13 and a diode 14. In this circuit, when the number N of rotations of the engine is relatively small, the output K of the integrating circuit 9 exceeds the output J of the adder circuit 6 and hence the comparator circuit 10 will not produce the output signal H. In other words, the integration voltage $V_1$ of the integrating circuit 9 exceeds the output voltage $V_2$ of the comparator circuit 6, thereby preventing the comparator circuit 10 from delivering an output. Thus, the advance angle signal H will not be produced. In such a case, the output signal E of the pulser 3 is delivered via resistor 13 and diode 14 to act as the ignition signal representative of the minimum advance angle $\alpha_{min}$. In this manner, within range A (FIG. 1) where the number of rotations of the engine is small, the minimum advance angle $\alpha_{min}$ is maintained. Next, as the number of rotations of the engine increases to lie within range B, the integration voltage $V_1$ lies between the fixed voltage $V_s$ and the maximum integration voltage $V_2$ so that, as described above, the comparator circuit 10 produces the advance angle pulse output H dependent on the number of rotations of the engine. In this case, after the comparator circuit 10 has delivered the advance angle pulse output H, the output signal E of the pulser 3 is delivered via the resistor 13 at the minimum advance angular position. But it is not before the advance angle pulse output H of the comparator circuit 10 has already been exhausted as the ignition pulse that the output pulse E of the pulser 3 is delivered, so that the output pulse E cannot contribute to the ignition signal. Next, when the number of rotations of the engine increases up to a predetermined high speed which lies within range C, the integration voltage $V_1$ of the integrating circuit 9 is below the fixed voltage $V_s$, the comparator circuit 10 produces the output concurrently with the commencement of integration of the integrating circuit. The fixed voltage $V_s$ can be derived from the Q output of the RS type flip-flop 4. Thus, the comparator circuit 10 produces, at the maximum advance angular position, the output pulse which acts as the ignition signal. In this case, too, the output signal E of the pulser 3 is delivered from the output terminal 12 via the resistor 13 at the minimum advance angular position, without contributing to the ignition signal. Briefly, the output signal E is wasted without causing the ignition.

As described above, the minimum advance angle $\alpha_{min}$ of ignition timing is maintained within range A where the engine rotates at predetermined low speeds, the ignition timing is advanced dependent on the number of rotations of the engine within range B where the engine rotates at intermediate speeds, and the maximum advance angle $\alpha_{max}$ of ignition timing is maintained within range C where the engine rotates at high speeds. A critical number of rotations of the engine, at which the ignition timing changes from the minimum advance angle $\alpha_{min}$ to that subjected to the advance angle controlling operation which is dependent on the number of rotations of the engine, occurs when the integration voltage $V_1$ of the integrating circuit 9 coincides with the maximum output voltage $V_2$ of the adder circuit 6, and is freely adjustable by changing levels of these voltages. It is also possible to freely select the minimum and maximum advance angular positions by changing the angle of the pulser. Further, a critical number of rotations of the engine, at which the ignition timing subjected to the advance angle controlling dependent on the number of rotations of the engine changes to the maximum advance angle $\alpha_{max}$, occurs when the integration voltage $V_1$ of the integrating circuit 9 coincides with the fixed voltage $V_s$, and is freely adjustable by changing levels of these voltages. Since the embodied circuit of FIG. 4 ensures that the advance angle of ignition timing changes within range B at which the engine rotates at certain speeds but is maintained at the minimum advance angle $\alpha_{min}$ or the maximum advance angle $\alpha_{max}$ when the engine rotates at the other speeds, it is not necessary to make this circuit adaptive to the whole speed ranges of the engine with high accuracies. In contrast, only within a certain range, herein referred to as range B, this circuit is required to be of a predetermined accuracy, thereby facilitating design for this circuit. In addition, since this embodiment ensures that the advance angle of ignition timing is determined during the period ranging from the detection of the preceding minimum advance angular position to the detection of the subsequent minimum advance angular position, no detection delay is accumulated, contributing to high accuracy.

Figure 6:
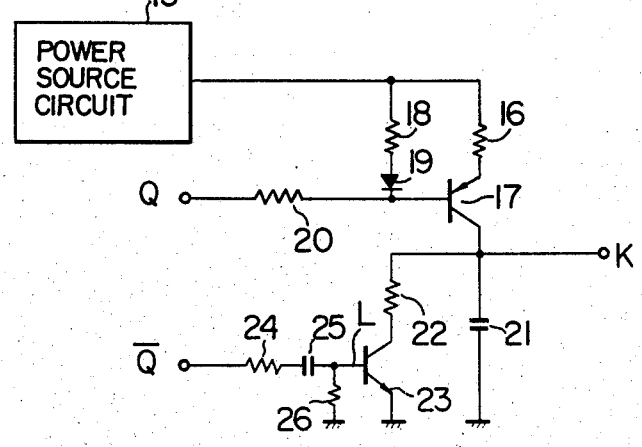
FIG. 6 is a circuit diagram exemplifying an integrating circuit 9 in FIG. 4.
Figure 7:
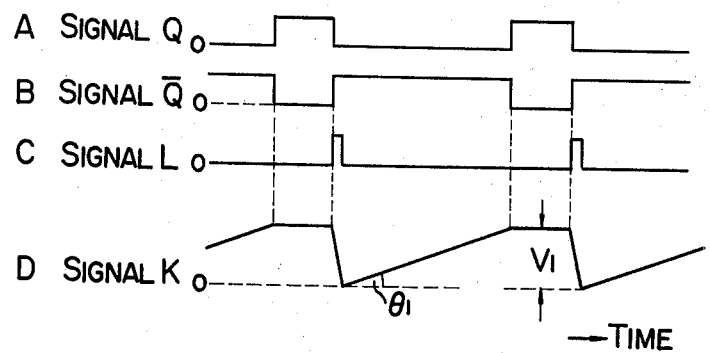
FIG. 7 is a diagram of wave forms illustrated at A, B, C and D to explain operation of the integrating circuit in FIG. 6.

The RS type flip-flop 4, integrating circuit 5, adder circuit 6 and comparator circuit 10 are well known in the art and will not be detailed herein. The integrating circuit 9 exemplified in FIG. 6 comprises a power source circuit 15, the output of which is connected to the emitter of a transistor 17 via a resistor 16 and to the base of the transistor 17 via a resistor 18 and a diode 19. The base of the transistor 17 receives the Q output $Q_o$ of the RS type flip-flop 4 via a resistor 20. The transistor 17 has its collector connected to one end of a capacitor 21, the other end of which is grounded. The collector of the transistor 17 is also connected to the collector of a transistor 23 via a resistor 22. The base of the transistor 23 receives the $\overline{Q}$ output $\overline{Q_o}$ of the RS type flip-flop 4 via a resistor 24 and a capacitor 25 constituting a differential circuit. Reference numeral 26 designates an emitter resistor of the transistor 23. With this circuit, when the Q output of the RS type flip-flop 4 is zero, the transistor 17 is turned on to charge the capacitor 21 with a constant current so that the voltage of the capacitor 21 increases at a fixed gradient of $\theta_1$. Subsequently, the Q output becomes high level to turn off the transistor 17 and the charging current through the capacitor 21 is stopped. At the same time, the transistor 23 is also turned off so that the charge of the capacitor 21 will not discharge and the capacitor 21 is maintained at a fixed voltage. Thereafter, as the Q output again falls to zero and the $\overline{Q}$ output becomes high level, the $\overline{Q}$ output is differentiated by the differential circuit comprised of the resistor 24 and the capacitor 25 to be converted into a voltage $L_o$ which renders the base of the transistor 23 positive for a short time. Thus, the transistor 23 is turned on for the short time and the charge of the capacitor 21 is discharged instantly with recovery of the voltage across the capacitor 21 to zero. When the positive differentiating pulse $L_o$ disappears, the transistor 23 is again turned off and the capacitor 21 is again charged with the constant current via the transistor 21. This operation is repeated to produce the voltage wave form K across the capacitor 21 as shown at D of FIG. 7. Briefly, with the Q output of zero, the capacitor 21 is charged with the constant current and the charged voltage $V_1$ is maintained while the Q output being high level; and with recovery of the Q output to zero, the voltage across the capacitor 21 falls to zero instantly to permit the constant current charging to commence. Having been described by way of an example as shown in FIG. 6, the integrating circuit 9 is not limited to this exemplary circuit.

Figure 8:
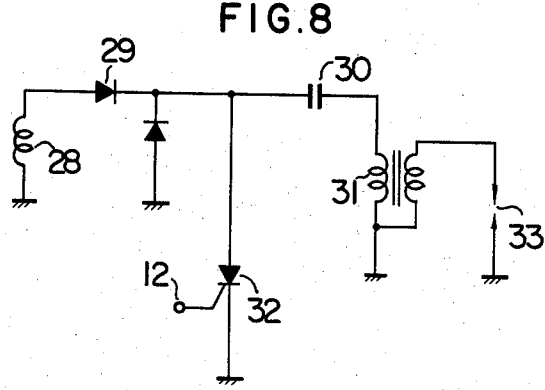
FIG. 8 is a circuit diagram of a semiconductor switch circuit, applicable to the circuit of FIG. 4, which utilizes a thyristor for generating a spark.

The circuit of FIG. 4 may be coupled with various types of ignition device such as a capacitor discharge type ignition device or a transistor ignition device. For example, a capacitor discharge type ignition device has a schematic circuit connection as shown in FIG. 8 which is constituted by a charging coil 28, a rectifier diode 29, a capacitor 30, an ignition coil 31 connected to the capacitor 30, and a thyristor 32 connected to the capacitor 30. The thyristor 32 has its gate connected to the output terminal 12 of the circuit shown in FIG. 4.

Accordingly, when the ignition signal is applied to the gate of the thyristor 32, the capacitor 30 discharges to create a spark at an ignition plug 33 connected to the ignition coil 31.

Figure 9:
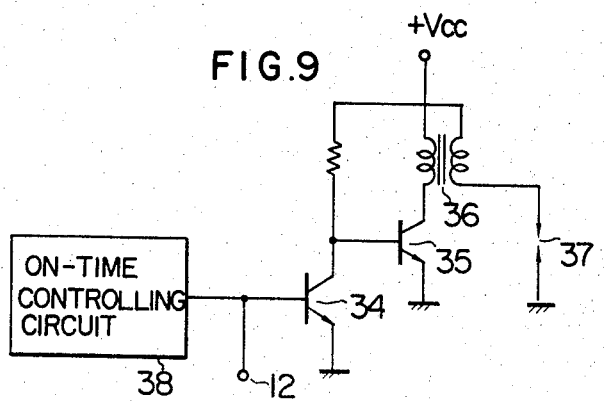
FIG. 9 is a circuit diagram of a semiconductor switch circuit, also applicable to the circuit of FIG. 4, which utilizes transistors for generating a spark.

An ignition device for creating a spark upon disconnection of a power source is shown in FIG. 9 which comprises transistors 34 and 35, an ignition coil 36, and an ignition plug 37. When the base of the transistor 34 is applied with the ignition signal from the output terminal 12 of the FIG. 4 circuit, the transistor 34 is turned on and the transistor 35 is turned off. Upon turning-off of the transistor 35, a spark is created at the ignition plug 37. Since this ignition circuit is arranged such that spark is created when the transistor 35 is turned off, the transistor 35 needs to be turned on in advance. A well-known on-time controlling circuit 38 is provided for this purpose and it acts to cause the transistor 35 to be turned on at a predetermined time in advance of turning-off of the transistor 35.

Figure 10:
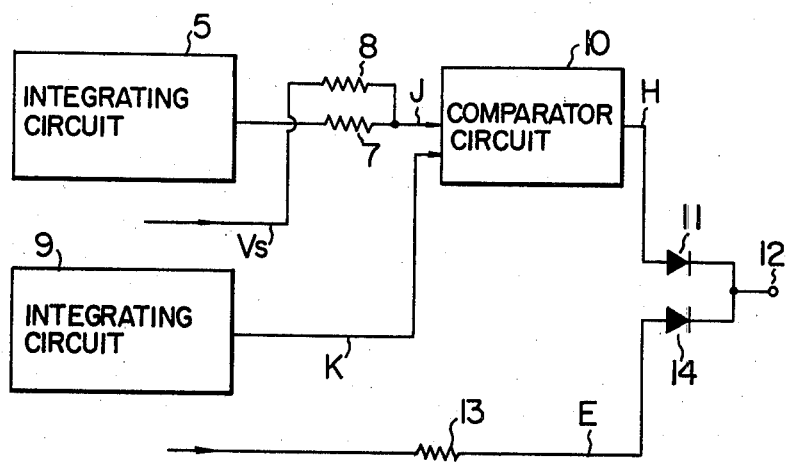
FIG. 10 is a partial circuit diagram of a partial alternation of the circuit shown in FIG. 4.

The integrating circuit 5, FIG. 10, may include a similar circuit connection to that of the integrating circit 9 and especially, may be constructed by omitting the capacitor 25 from the integrating circuit as shown in FIG. 6.

In the circuit of FIG. 4, the output J of the adder circuit 6 is compared with the output K of the integrating circuit 9 at the comparator circuit 10 but alternatively, as shown in FIG. 10, the adder circuit 6 may be dispensed with wherein the output of the integrating circuit 5 may be combined with the output of the RS type flip-flop 4 so as to be compared with the output K of the integrating circuit 9.

The advance angle controlling circuit of FIG. 4 corresponds to a one-channel advance angle controlling circuit having a set of first and second pulsers, and a series type four-cylinder engine requires two channels while a V type four-cylinder engine requires four channels.

In contrast to the foregoing embodiment employing two pulsers, first and second pulsers, for detecting the maximum and minimum advance angular positions, a single pulser may cooperate with a magnetic rotor 1 provided with a projection having a peripheral width substantially corresponding to the maximum advance angle in order to obtain the two signals, that is, signals D and E, representative of the maximum advance angle and the minimum advance angle. Where a plurality of pulsers are arranged to cooperate with the above magnetic rotor and a single advance angle controlling circuit essentially identical with the advance angle controlling circuit of the foregoing embodiment, it is possible to distribute the ignition signal to a plurality of engine cylinders. The advance angle controlling circuit of the FIG. 4 embodiment lacks such capability of distribution.

Figure 11:
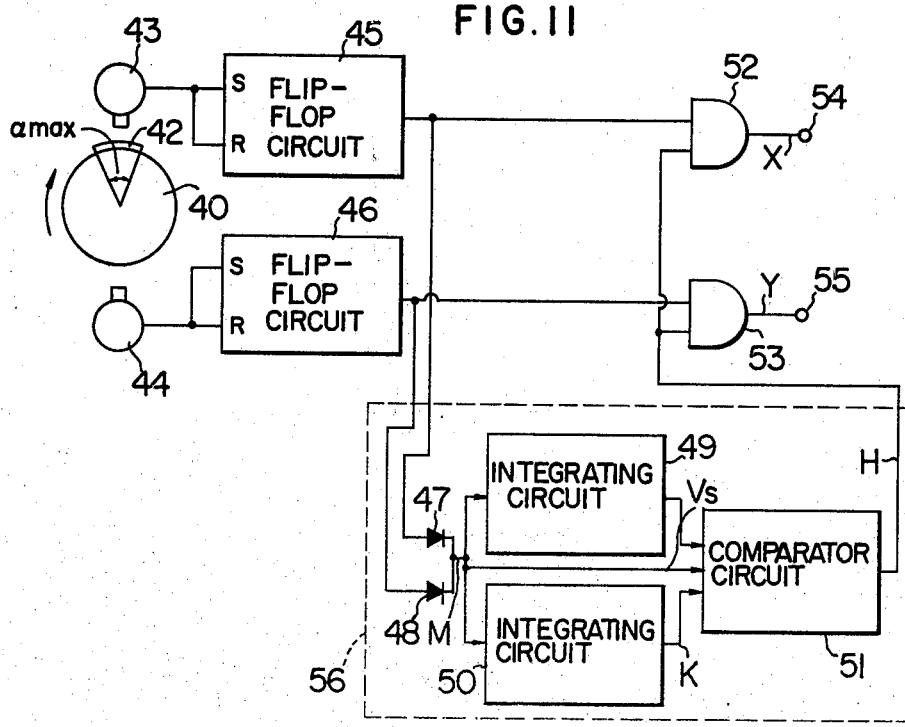
FIG. 11 is a block diagram of another embodiment of the advance angle controlling unit in the system according to the invention.

FIG. 11 shows an embodiment of an advance angle controlling circuit with distribution function which is applicable to a two-cylinder two-stroke cycle engine, for example.

As shown in FIG. 11, a magnetic rotor 40 rotatable in synchronism with rotation of the engine has a peripheral projection 42 having a peripheral width corresponding to the maximum advance angle $\alpha_{max}$. An ignition signal generating pulser 43 (a first pulser) provided for a first cylinder generates a voltage signal as shown at A of FIG. 12, and an ignition signal generating pulser 44 (a second pulser) provided for a second cylinder generates a voltage signal as shown at B of FIG. 12.

Figure 12:
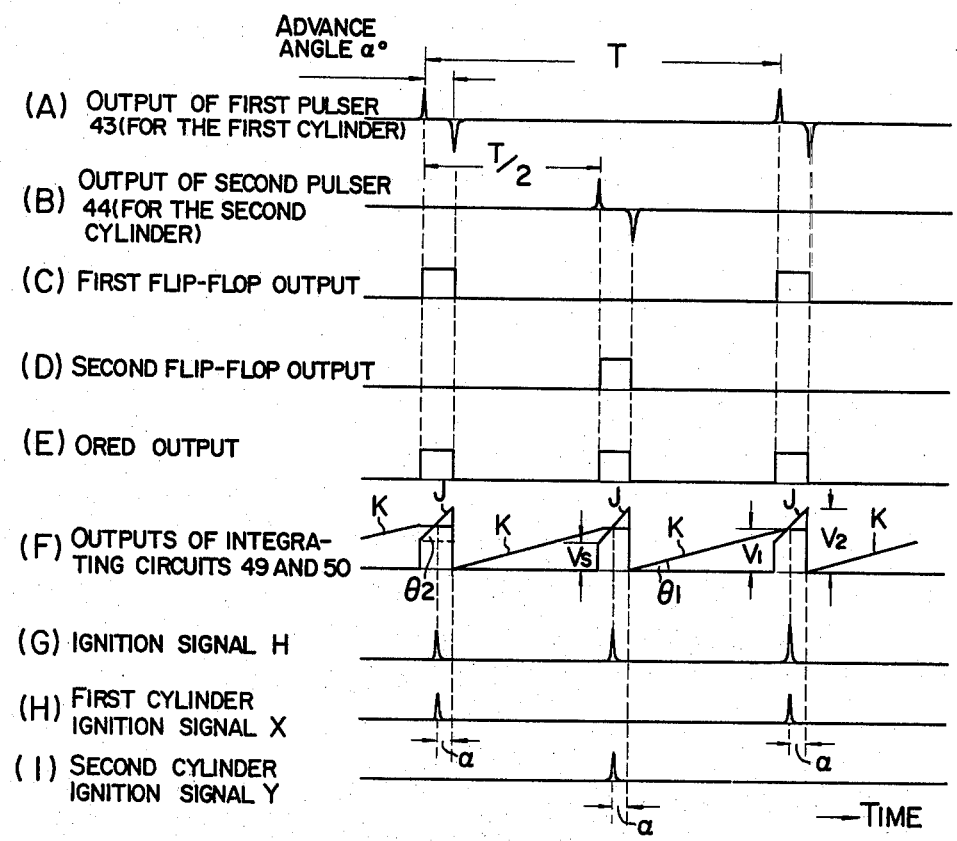
FIG. 12 is a diagram of wave forms illustrated at A to I to show output signals from component circuits in FIG. 11 for the sake of explaining operation of the FIG. 11 circuit.

A first RS type flip-flop 45 is driven by the first pulser 43 to produce a signal as shown at C of FIG. 12. A second RS type flip-flop 46 is driven by the second pulser 44 to produce a signal as shown at D of FIG. 12. Diodes 47 and 48 constitute an OR-gate which delivers a signal M as shown at E of FIG. 12. A triangular waveform generating circuit 49, that is, an integrating circuit generates a triangular wave form of a constant graident which is added with a fixed voltage $V_s$ to form a signal J as shown at F of FIG. 12. A triangular wave form generating circuit 50, that is, an integrating circuit generates a triangular wave form of a constant gradient corresponding to a signal K as shown at F of FIG. 12. A comparator circuit 51 compares output voltages of the two triangular wave form generating circuits 49 and 50 and produces an output signal H as shown at G of FIG. 12. A first AND-gate 52 (for the first cylinder) produces an ANDed output X from outputs of the first RS type flip-flop 45 and the comparator circuit 51, the ANDed output X (for igniting the first cylinder) as shown at H of FIG. 12 being sent to an output terminal 54. Similarly, a second AND-gate 53 produces an ANDed output Y (for igniting the second cylinder) from outputs of the second RS type flip-flop 46 and the comparator circuit 51, the ANDed output Y being sent to an output terminal 55.

Referring to FIGS. 11 and 12, the above circuit operates as follows. The first pulser produces as the ignition signal for the first cylinder a voltage (for example, a positive pulse voltage) which determines the maximum advance angle $\alpha_{max}$ and a voltage (for example, a negative pulse voltage) which determines the minimum advance angle $\alpha_{min}$ that is for determining the minimum advance angle $\alpha_{min}$ of ignition timing during engine idling, as shown at A of FIG. 12. Similarly, the second pulser produces as the ignition signal for the second cylinder positive and negative pulse voltages as shwon at B of FIG. 12. Thus, a reference signal of the pulses spaced by an interval corresponding to the width of the advance angle is generated for each cylinder. The output of the RS type flip-flop 45 is a flip-flop signal triggered by the first pulser 43 and the output of the RS type flip-flop 46 is a flip-flop signal triggered by the second pulser 44. A signal M shown at E of FIG. 12 corresponds to the output signal of the OR-gate when diodes 47 and 48 receive the outputs of the RS type flip-flops 45 and 46. As described in the foregoing description, the circuit for electronically obtaining the advance angle operates to generate wave forms as shown at F of FIG. 12, of which the triangular wave form K having a constant gradient is produced while the outputs of the OR-gate comprised of the diodes 47 and 48 are zero or nullified, but the triangular wave form K is locked at the voltage $V_1$ and the number of rotations of the engine is determined while the outputs of the diodes 47 and 48 are valid. As the number of rotations of the engine increases, the interval during which the output voltages M of the OR-gate comprised of the diodes 47 and 48 are nullified decreases so that the locked voltage $V_1$ decreases in inverse proportion to the number N of rotations of the engine. Such an advance angle controlling operation has already been detailed hereinbefore.

Concurrently with presence of the outputs of the diodes 47 and 48, the triangular wave form J having a second constant gradient which corresponds to the triangular wave form G of FIG. 2 is generated, and the triangular wave forms K and J are compared to produce the ignition signal H when levels of both the triangular wave forms coincide with each other. The ignition signal H has a period (for example, 180 degrees) as shown at G of FIG. 12.

The ignition signal H and the output of the RS type flip-flop 45 are ANDed to produce the ignition signal X for the first cylinder and similarly, the output of the RS type flip-flop 46 and the ignition signal H are ANDed to produce the ignition signal Y for the second cylinder. These ignition signals X and Y are advanced by α with respect to the associated minimum advance angular positions. Ignition signals appearing at the output terminals 54 and 55 are applied to such an ignition device as illustrated in FIG. 8 or 9.

Thus, the embodiment as described with reference to FIGS. 11 and 12 suffices with the single advance angle controlling circuit 56 comprised of the first and second integrating circuits 49 and 50 and the comparator circuit 51 for the sake of obtaining the advance angle capability adaptive to a plurality of engine cylinders, giving rise to uniform advance angle characteristic for individual engines. The single circuit 56, providing a satisfactory single channel, is inexpensive and easy to adjust. For these reasons, a stable advance angle characteristic can be ensured.

The embodied arrangement as shown in FIG. 11 is applicable to two-cylinder two-stroke cycle engines as well as two-cylinder four-stroke cycle engines and series type four-cylinder four-stroke cycle engines.

Figure 13:
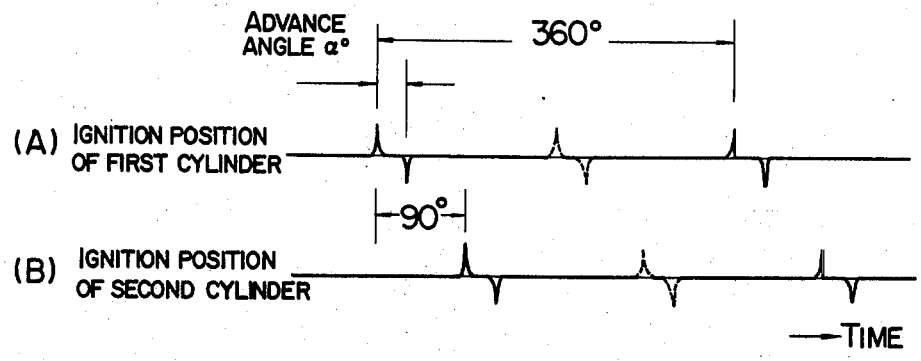
FIG. 13 is a diagram of wave forms illustrated at A and B to show outputs of a modified pulser arrangement.
Figure 14:
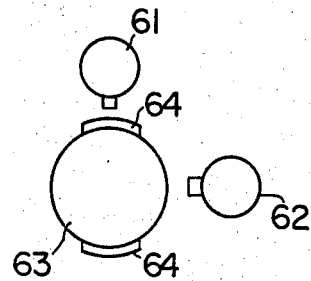
FIG. 14 is a diagram showing positional relation between projections of a magnetic rotor and pulsers in the modification of FIG. 13.

According to the FIG. 11 arrangement, the ignition signal H has a fixed period. However, depending on type of the engine, the ignition intervals of first and second cylinders are designed to be different as shown in FIG. 13. In such as case, it is impossible to detect the number of rotations of the engine by using the triangular wave form of constant gradient. To solve this problem, as shown in FIG. 14, it is advantageous to provide a magnetic rotor 63 having two opposite projections 64 which cooperate with two pulsers 61 and 62, disposed about the rotary shaft of the rotor 63 and mutually spaced 90 degrees, to produce ignition position reference signals as shown at dotted lines in FIG. 13. The reference signal is generated at the lower dead point in the case of two-stroke cycle engines and at the end of the exhaust stroke in the case of four-stroke cycle engines, without adversely affecting the normal capability of the engine.

What we claim is:

1. A contactless ignition system for use with an internal combustion engine comprising:
    a magnetic rotor with means rotatable in synchronism with the engine for detecting an ignition angle,
    means for controlling the advance of ignition timing,
    a semiconductor switching circuit actuatable with an ignition signal delivered from said advance angle controlling means, and
    an ignition coil connected to said semiconductor switching circuit,
    said advance angle controlling means comprising:
    means for detecting a predetermined maximum advance angular position of ignition timing in cooperation with said magnetic rotor,
    means for detecting a predetermined minimum advance angular position of ignition timing in cooperation with said magnetic rotor,
    a first integrating circuit which starts an integration in response to the detection of the maximum advance angular ignition position and terminates the integration in response to the detection of the minimum advance angular position to generate an output of a first triangular wave form,
    adder means for adding a signal of a predetermined, fixed level to the output of said first integrating circuit,
    a second integrating circuit which starts an integration in response to the detection of the minimum advance angular position and terminates the integration in response to the detection of the maximum advance angular position to generate an output of a second triangular wave form, and
    a comparator circuit which produces said ignition signal when the output level of said adder means coincides with the output level of said second integrating circuit,
    said second integrating circuit including a constant current source, a first switching element and a capacitor connected in series with said constant current source, an output terminal connected to a junction of said first switching element and said capacitor, and a second switching element connected in parallel with said capacitor, wherein said constant current source starts charging said capacitor when said first switching element is rendered conductive by an output of said minimum advance angular position detecting means, the charging to said capacitor is stopped when said first switching element is rendered non-conductive by an output of said maximum advance angular position detecting means, and said capacitor is discharged when said second switching element is rendered conductive by the output of said minimum advance angular position detecting means, whereby said second triangular wave form is delivered out from said output terminal.

2. A contactless ignition system according to claim 1 wherein the detecting means of said magnetic rotor comprises a single projection, said maximum advance angular position detecting means comprises a single pulser, and said minimum advance angular position detecting means comprises a single pulser.

3. A contactless ignition system according to claim 1 wherein the detecting means of said magnetic rotor comprises a permanent magnet, said maximum advance angular position detecting means comprises a single pulser, and said minimum advance angular position detecting means comprises a single pulser.

4. A contactless ignition system according to claim 1 wherein the detecting member of said magnetic rotor comprises a single projection having a peripheral width substantially corresponding to the predetermined maximum advance angle, and each of said maximum and minimum advance angular position detecting means has a single pulser.

5. A contactless ignition system of use with an internal combustion engine comprising:
    a magnetic rotor with means rotatable in synchronism with the engine for detecting an ignition angle, said means having a peripheral width corresponding to a difference between a predetermined maximum advance angle and a predetermined minimum advance angle,
    means for controlling the advance angle of ignition timing,
    a semiconductor switching circuit actuatable with an ignition signal delivered from said advance angle controlling means, and an ignition coil connected to said semiconductor switching circuit, said advance angle controlling means comprising:

a plurality of pulsers, each of which is adapted to detect maximum and minimum advance angular positions of ignition timing in cooperation with said magnetic rotor, a first integrating circuit which starts an integration in response to the detection of the maximum advance angular position derived from the respective pulsers and terminates the integration in response to the detection of the minimum advance angular position derived from the respective pulsers to generate an output of a first triangular wave form, adder means for adding a signal of a fixed level to the output of said first integrating circuit, a second integrating circuit which starts an integration in response to the detection of the minimum advance angular position derived from the respective pulsers and terminates the integration in response to the detection of the maximum advance angular position to generate an output of a second triangular wave form, a comparator circuit which produces an output signal when the output level of said adder means coincides with the output level of said second integrating circuit, and a plurality of AND-gates being of the same number as said pulsers, respective AND-gates having one input terminal connected to an output of the respective pulsers and another input terminal connected to the output of said comparator circuit to produce the ignition signal associated with the respective pulsers.

6. A contactless ignition system according to claim 5 wherein the first triangular wave form delivered from said first integrating circuit has a predetermined, constant rising gradient which is larger than that of the second triangular wave form delivered from said second integrating circuit.

7. A contactless ignition system according to claim 5 wherein the detecting means of said magnetic rotor comprises two projections disposed on a straight line including the central shaft of said rotor, and two pulsers for detecting the maximum and minimum advance angular positions respectively are disposed about the central shaft of said magnetic rotor and mutually spaced 90 degrees.

8. A contactless ignition system according to claim 5 comprising said second integrating circuit including a constant current source, a first switching element and a capacitor connected in series with said constant current source, an output terminal connected to a junction of said first switching element and said capacitor, and a second switching element connected in parallel with said capacitor, wherein said constant current source starts charging said capacitor when said first switching element is rendered conductive by the output of said minimum advance angular position detecting means, the charging to said capacitor is stopped when said first switching element is rendered non-conductive by the output of said maximum advance angular position detecting means, and said capacitor is discharged when said second switching element is rendered conductive by the output of said minimum advance angular position detecting means, whereby said second triangular wave form is delivered out from said output terminal.

9. A contactless ignition system for use with an internal combustion engine comprising:

a magnetic rotor with projection means rotatable in synchronism with the engine for detecting an ignition angle, means for controlling the advance angle of ignition timing, a semiconductor switching circuit actuatable with an ignition signal delivered from said advance angle controlling means, and an ignition coil connected to said semiconductor switching circuit, said advance angle controlling means comprising:

a first pulser means for detecting a predetermined maximum advance angular position of ignition timing in cooperation with said magnetic rotor, a second pulser means for detecting a predetermined minimum advance angular position of ignition timing in cooperation with said magnetic rotor, a bistable multivibrator having its set terminal connected to an output of said first pulser means and its reset terminal connected to an output of said second pulser means to produce a first output signal and a second output which is the inversion of said first output signal, a first integrating circuit which starts an integration in response to rising of the first output of said multivibrator in response to the detection of the maximum advance angular ignition position and terminates the integration in response to falling of said first output in response to the detection of the minimum advance angular position to generate an output of a first triangular wave form having a first predetermined gradient, adder means for adding the first output of predetermined fixed level of said multivibrator to the output of said first integrating circuit, a second integrating circuit including a capacitor which starts being charged with a constant current in response to falling of the first output of said multivibrator in response to the detection of the minimum advance angular position and which is discharged by a differentiation signal derived from the second output of said multivibrator in response to the detection of the maximum angular position, thereby generating an output of a second triangular wave form having a second predetermined gradient, said second integrating circuit including a constant current source, a first switching element and a capacitor connected in series with said constant current source, an output terminal connected to a junction of said first switching element and said capacitor, and a second switching element connected in parallel with said capacitor, wherein said constant current source starts charging said capacitor when said first switching element is rendered conductive by an output of said minimum advance angular position detecting means, the charging to said capacitor is stopped when said first switching element is rendered non-conductive by an output of said maximum advance angular position detecting means, and said capacitor is discharged when said second switching element is rendered conductive by the output of said minimum advance angular position detecting means, whereby said second triangular wave form is delivered out from said output terminal, a comparator circuit which produces said ignition signal when the output level of said adder means coincides with the output level of said second integrating circuit, and means for connecting the output signal of said second pulser to an output terminal of said advance angle controlling means.

10. A contactless ignition system for use with an internal combustion engine comprising:

a magnetic rotor with projection means rotatable in synchronism with the engine, means for controlling the advance angle of ignition timing, a semiconductor switching circuit actuatable with an ignition signal delivered from said advance angle controlling means, and an ignition coil connected to said semiconductor switching circuit, said projection means of said magnetic rotor having a peripheral width substantially corresponding to a difference between a predetermined maximum advance angle and a predetermined minimum advance angle, said advance angle controlling means comprising:

a first pulser for detecting predetermined maximum and minimum advance angular positions of ignition timing in cooperation with said magnetic rotor, a second pulser for detecting the predetermined maximum and minimum advance angular positions of ignition timing in cooperation with said magnetic rotor, a first bistable multivibrator having its set and reset terminals connected to an output of said second pulser, a second bistable multivibrator having its set and reset terminals connected to an output of said second pulser, means to OR respective outputs of said first and second bistable multivibrators, a first integrating circuit which starts an integration in response to rising of an ORed signal obtained from said first and second multivibrators and terminates the integration in response to falling of said ORed signal to generate an output of a first triangular wave form having a first predetermined gradient, adder means for adding the ORed signal to the output of said first integrating circuit, a second integrating circuit including a capacitor which starts being charged with a constant current in response to falling of the ORed signal and which is discharged by a differentiation signal derived from the ORed signal, thereby generating an output of a second triangular wave form having a second predetermined gradient, a comparator circuit which produces a output signal when the output level of said adder means coincides with the output level of said second integrating circuit, and first and second AND-gates respectively having one input terminal connected to each of said first and second bistable multivibrators and another input terminal connected to the output of said comparator circuit to produce the ignition signal associated with the respective first and second pulsers.

* * * * *